United States Patent
Dokter et al.

(10) Patent No.: US 9,696,147 B2
(45) Date of Patent: Jul. 4, 2017

(54) AUTOMATIC TRACK ALIGNMENT CONTROL KIT AND METHOD FOR AUTOMATED TRACK ALIGNMENT

(71) Applicant: LEICA GEOSYSTEMS AG, Heerbrugg (CH)

(72) Inventors: Jeremy Dokter, Heerbrugg (CH); Adriaan Bakker, Zwaag (NL)

(73) Assignee: LEICA GEOSYSTEMS AG, Heerbrugg (CH)

( * ) Notice: Subject to any disclaimer, the term of this patent is extended or adjusted under 35 U.S.C. 154(b) by 45 days.

(21) Appl. No.: 14/783,850

(22) PCT Filed: Apr. 9, 2014

(86) PCT No.: PCT/EP2014/057143
§ 371 (c)(1),
(2) Date: Oct. 10, 2015

(87) PCT Pub. No.: WO2014/166989
PCT Pub. Date: Oct. 16, 2014

(65) Prior Publication Data
US 2016/0069671 A1    Mar. 10, 2016

(30) Foreign Application Priority Data
Apr. 10, 2013  (EP) .................................. 13163173

(51) Int. Cl.
*G01B 11/26* (2006.01)
*G01C 15/00* (2006.01)
(Continued)

(52) U.S. Cl.
CPC ............ *G01B 11/26* (2013.01); *E01C 19/006* (2013.01); *E01C 19/48* (2013.01); *G01C 3/00* (2013.01); *G01C 15/002* (2013.01)

(58) Field of Classification Search
None
See application file for complete search history.

(56) References Cited

U.S. PATENT DOCUMENTS 4,029,165 A * 6/1977 Miller .................... B62D 11/20
                                                180/6.48
4,130,362 A * 12/1978 Lill ........................ G01B 11/26
                                                33/288
(Continued)

FOREIGN PATENT DOCUMENTS

CN      101929122 A    12/2010
CN      202073011 U    12/2011
(Continued)

OTHER PUBLICATIONS

European Search Report dated Aug. 27, 2013 as received in Application No. 13 16 3173.

*Primary Examiner* — Tri Ton
*Assistant Examiner* — Jarreas C Underwood
(74) *Attorney, Agent, or Firm* — Maschoff Brennan

(57) ABSTRACT

The invention relates to a method for aligning tracks of a roadwork machine, characterized by using a track alignment detection unit that is attached to a first track unit for allowing detection of an orientation of the first track unit, and frame orientation detection means that are attached to the machine frame for allowing detection of an orientation of the machine frame, the method comprising determining an initial orientation of the machine frame, and determining an initial orientation of the first track unit, determining whether a difference between a most recently determined orientation of the machine frame and a most recently determined orientation of the first track unit is within a predefined threshold value, initializing a pivoting of the first track unit, (Continued)

determining a changed orientation of the first track unit after the pivoting, and determining an orientation of the machine frame after the pivoting.

13 Claims, 10 Drawing Sheets

(51) Int. Cl.
*G01C 3/00* (2006.01)
*E01C 19/00* (2006.01)
*E01C 19/48* (2006.01)

(56) References Cited

U.S. PATENT DOCUMENTS

| | | | | |
|---|---|---|---|---|
| 5,267,014 A * | 11/1993 | Prenninger | ............ | G05B 19/18 348/135 |
| 5,488,472 A * | 1/1996 | January | ............ | G01B 11/2755 33/288 |
| 5,599,134 A * | 2/1997 | Macku | ............ | E01C 19/008 404/84.1 |
| 6,109,825 A * | 8/2000 | Yon | ............ | E01C 19/008 404/84.05 |
| 6,181,993 B1 * | 1/2001 | Dale, Jr. | ............ | G01B 11/275 33/203.18 |
| 6,205,401 B1 * | 3/2001 | Pickhard | ............ | G01C 21/165 342/358 |
| 6,256,893 B1 * | 7/2001 | Forborgen | ............ | B62D 15/02 33/1 N |
| 6,692,185 B2 * | 2/2004 | Colvard | ............ | B62D 7/026 180/411 |
| 6,729,596 B2 * | 5/2004 | Fumado Gilabert | . | E01C 19/004 248/550 |
| 8,068,962 B2 * | 11/2011 | Colvard | ............ | E01C 19/006 404/84.05 |
| 8,788,154 B2 * | 7/2014 | O'Connor | ............ | G05D 1/0236 356/141.4 |
| 8,794,868 B2 * | 8/2014 | Fritz | ............ | E01C 19/006 404/84.5 |
| 9,279,679 B2 * | 3/2016 | Kumagai | ............ | E01C 19/006 |
| 2002/0047301 A1 * | 4/2002 | Davis | ............ | E01C 19/006 299/1.5 |
| 2006/0198700 A1 * | 9/2006 | Maier | ............ | E01C 19/004 404/84.1 |

FOREIGN PATENT DOCUMENTS

| | | |
|---|---|---|
| CN | 202170459 U | 3/2012 |
| DE | 19951296 A1 | 6/2001 |
| DE | 101 38 563 A1 | 2/2003 |
| EP | 2006448 A1 | 12/2008 |
| GB | 2366381 A | 3/2002 |
| WO | 2006092441 A1 | 9/2006 |

\* cited by examiner

AUTOMATIC TRACK ALIGNMENT CONTROL KIT AND METHOD FOR AUTOMATED TRACK ALIGNMENT

FIELD OF THE INVENTION

The invention relates to an automated method for aligning the tracks of an automated roadwork machine with the machine orientation which is defined by the alignment of the surface processing unit, e. g. a mould unit. Such tracked automated roadwork machines comprise paving machines, such as mainline pavers or pavers for curb and gutters, as well as milling machines and surface miners.

BACKGROUND

Particularly, such tracked automated roadwork machines include slipform pavers for producing a surface layer comprising concrete or asphalt material. Slipform pavers are construction machines with a characteristic finishing screed which serves, for example, for the installation of concrete or asphalt. The screed can also be formed with a characteristic profile, for example for the production of rails, channels or water grooves. Screeds are therefore produced for a wide variety of applications, i.e. with different screed profiles and screed widths.

The control of such road finishers can be effected by means of reference line scanning devices. A sensor scans the required direction and/or required height of a reference line, such as, for example, a tensioned wire; deviations from the required direction/required height are corrected by a regulating means. DE 101 38 563 discloses a wheel-type road finisher which automatically follows a reference line. In U.S. Pat. No. 5,599,134, scanning of a reference line is effected without contact, by means of ultrasonic sensors. However, this method of controlling a machine requires setting out of the area to be processed before the use of the construction vehicle and is very time-consuming and labor-intensive.

The method described in WO 2006/092441 A1 envisages mounting two masts with prisms on the crossbeams of a rigid machine frame formed from longitudinal beams and crossbeams and determining the distance and direction to the prisms by means of one or two tacheometers or total stations, and hence determining the position of the prisms or of the machine. These tacheometers or total stations are advantageously motor-powered and capable of automatically following the reflector. This document does not describe a method for aligning the track units to the machine frame, though.

For excellent straight line performance, tracked automated roadwork machines such as slipform pavers require their tracks to be accurately aligned to the surface processing unit (e. g. a roadwork unit such as a mould unit) of the machine. Machine manufactures and operators have developed many methods of aligning the tracks manually and with assistance of laser measurement tools.

When aligning tracks in this way, the following difficulties arise:
  Accurately projecting the heading of the mould to the track, e. g. using a string.
  Measuring the track against the projected string alignment to millimetre precision on rough ground.
  Communicating millimetre rotational movement commands from the person looking at the track to the operator of the machine.
  Moving the tracks with the ultra-fine movements that are required to align the track.

Also, on several surfaces, when the tracks are pivoted the mould unit will often move slightly. This requires an iterative process of aligning the track to the surface processing unit, then re-checking the surface processing unit's heading, as it unintentionally might have moved, realigning the track, and so forth.

SUMMARY

Some embodiments of the invention provide an improved method for aligning the tracks of an automated roadwork machine to its surface processing unit.

Some embodiments of the invention provide a system for execution of said method, i.e. for aligning the tracks of an automated roadwork machine to its surface processing unit.

The invention relates to an automated method for aligning the tracks of a roadwork machine with the machine orientation. The machine orientation is defined by the alignment of the surface processing unit, e. g. a mould unit.

The method according to the invention employs the capabilities of robotic total stations, combined with the machine control abilities of 3D guidance systems already installed: A robotic total station is setup next to the machine, and prisms or other retro-reflective means are arranged at the tracks of the machine and on the surface processing unit, respectively a machine frame the surface processing unit is mounted on. For instance, the prisms can be attached magnetically. A control and evaluation unit is provided on or near the machine and connected to the total station and the machine control system, in particular wireless. Particularly, the control and evaluation unit is a part of the machine control system which is fixedly mounted on the machine.

In particular, the user starts the alignment process by manually measuring the initial mould and track positions, and then the Automatic Track Alignment Control Kit (ATACK) will automatically calculate, align, and recheck mould unit and track positions until the tracks are in line with the mould unit/machine frame orientation. The mould and track calibration process can be combined and/or processed in a separate process. The track alignments can be performed per track or for all tracks in one process.

According to the invention, a method for aligning tracks of a roadwork machine, wherein the roadwork machine is designed for producing and/or processing a surface layer comprising concrete or asphalt material along a predetermined path, and comprises a machine frame with a surface processing unit for carrying out a material processing step, a plurality of track units with tracks for moving the roadwork machine along a first axis and actuator means for pivoting the track units about a second axis with respect to the machine frame, wherein the second axis is basically orthogonal to the first axis, and a machine guidance system for controlling the tracks and the actuator means of the track units, comprises using a track alignment detection unit that is attached to a first track unit for allowing detection of an orientation of the first track unit, and frame orientation detection means that are attached to the machine frame for allowing detection of an orientation of the machine frame. The method further comprises
  determining an initial orientation of the machine frame,
  determining an initial orientation of the first track unit,
  determining whether a difference between a most recently determined orientation of the machine frame and a most recently determined orientation of the first track unit is within a predefined threshold value, initializing a pivoting of the first track unit,
determining a changed orientation of the first track unit after the pivoting, and
determining an orientation of the machine frame after the pivoting.

In one embodiment, the method comprises the repetition of the following steps until an angular difference between a most recently determined orientation of the machine frame and a most recently determined orientation of the first track unit is within a predefined threshold value:

reiteratively pivoting the first track unit and determining its orientation after the pivoting, until the angular difference is within the predefined threshold value, and determining an orientation of the machine frame and/or the surface processing unit.

In one embodiment of the method, for pivoting the track unit, a correction angle is calculated in a control and evaluation unit, wherein the track unit is pivoted about the correction angle.

In one embodiment of the method, the steps of determining an initial orientation of the machine frame, and determining an initial orientation of the first track unit, are performed by a user using a geodetic surveying instrument, particularly a robotic total station or tacheometer.

In one embodiment of the method, the steps of determining a changed orientation of the first track unit after the pivoting and determining an orientation of the machine frame after the pivoting are performed automatically by means of a geodetic surveying instrument, particularly a robotic total station or tacheometer.

In a preferred embodiment of the method, the track alignment detection unit comprises at least one reflector or retro-reflector, and a geodetic surveying instrument is used for determining the orientations, by measuring the distance and direction to the at least one (retro-) reflector, the geodetic surveying instrument particularly being a robotic total station or tacheometer.

In an alternative embodiment, the second orientation detection means comprise a (retro-)reflector and an optically perceivable pattern, particularly comprising light emitting diodes, and determining the orientations is performed by means of a laser tracker having camera means.

In one embodiment of the method, the track alignment detection unit comprises two (retro-)reflectors. In particular, the two (retro-)reflectors are either fixedly connected to each other in a known distance, or the track alignment detection unit comprises two parts, each part providing a (retro-)reflector.

In a particular embodiment of the method, the track alignment detection unit comprises two retro-reflectors, wherein the two retro-reflectors are positioned on the track unit at a known distance from each other, and calculating the correction angle is based on the most recently determined orientation of the machine frame, the most recently determined orientation of the track unit and the known distance between the two retro-reflectors. In particular, the correction angle is calculated by the equation $$\alpha = \sin\left(\frac{\text{frame orientation} - \text{track orientation}}{2}\right) \cdot \left(\frac{d}{2}\right) \cdot 2,$$

wherein $\alpha$ is the correction angle, "frame orientation" is the most recently detected orientation of the machine frame (or of the surface processing unit, respectively), "track orienta-tion" is the most recently detected orientation of the track unit and d is the known distance between the two retro-reflectors.

The invention also relates to an Automatic Track Alignment Control Kit (ATACK) for aligning tracks of a roadwork machine, the roadwork machine being designed for producing and/or processing a surface layer comprising concrete or asphalt material along a predetermined path, and comprising a machine frame with a surface processing unit for carrying out a material processing step, a plurality of track units with tracks for moving the roadwork machine along a first axis and actuator means for pivoting the track units about a second axis with respect to the machine frame, wherein the second axis is basically orthogonal to the first axis, and a machine guidance system for controlling the tracks and the actuator means of the track units.

According to the invention, the ATACK comprises an orientation determining device comprising a laser range finder, particularly a geodetic surveying instrument, a track alignment detection unit comprising at least one (retro-) reflector for use with the laser range finder, and a control and evaluation unit, wherein the track alignment detection unit is designed for being attachable to a track unit of the roadwork machine, the orientation determining device is designed for determining an orientation of the track unit and an orientation of the machine frame, and the control and evaluation unit is designed for determining an orientation of the track unit relative to the machine frame and for sending a command to the machine guidance system to pivot the track unit in order to align the track unit to the surface processing unit.

In one embodiment, the ATACK comprises frame orientation detection means for use with the laser range finder for allowing detection of the orientation of the machine frame (or of the surface processing unit), the frame orientation detection means comprising at least one retro-reflector and being attachable to the machine frame, in particular by means of magnets. Particularly, the frame orientation detection means comprise two retro-reflectors, one 6DOF retro-reflector or a retro-reflector and an optically perceivable pattern.

In one embodiment of the ATACK, the track alignment detection unit comprises two retro-reflectors that are fixedly connected to each other in a known distance. In another embodiment the track alignment detection unit comprises two parts, each providing a retro-reflector. In a further embodiment the track alignment detection unit comprises a retro-reflector and an optically perceivable pattern, particularly comprising light emitting diodes for allowing determining an orientation of the track alignment detection unit.

In one embodiment of the ATACK, the orientation determining device has means for automatically aiming the laser range finder at the at least one retro-reflector of the track alignment detection unit and automatically measuring a distance and direction to the retro-reflector, in particular wherein the orientation determining device is a robotic total station or tacheometer or a laser tracker.

In a further embodiment of the ATACK, the control and evaluation unit is designed for performing the following steps:

initializing a pivoting of the first track unit,
determining the orientation of the first track unit after pivoting,
determining an orientation of the machine frame after pivoting, and
determining whether a difference between a most recently determined orientation of the machine frame and a most recently determined orientation of the first track unit is within a predefined threshold value.

The invention also pertains to a track alignment detection unit for use in a method for aligning tracks of a roadwork machine. According to the invention the track alignment detection unit comprises at least one retro-reflector for use with a laser range finder and magnet means for removably attaching the track alignment detection unit to a track unit of the roadwork machine.

The invention furthermore pertains to a computer programme product comprising programme code which is stored on a machine-readable medium, or being embodied by an electromagnetic wave comprising a program code segment, having computer-executable instructions for performing the following steps:

initializing a pivoting of the first track unit,
determining the orientation of the first track unit after pivoting,
determining an orientation of the machine frame after pivoting, and
determining whether a difference between a most recently determined orientation of the machine frame and a most recently determined orientation of the first track unit is within a predefined threshold value.

BRIEF DESCRIPTION OF THE DRAWINGS

The method and systems according to the invention are described in more detail below, purely by way of example, with reference to specific embodiments shown schematically in the drawings, further advantages of the invention also being discussed. Specifically.

DETAILED DESCRIPTION

Figure 1:
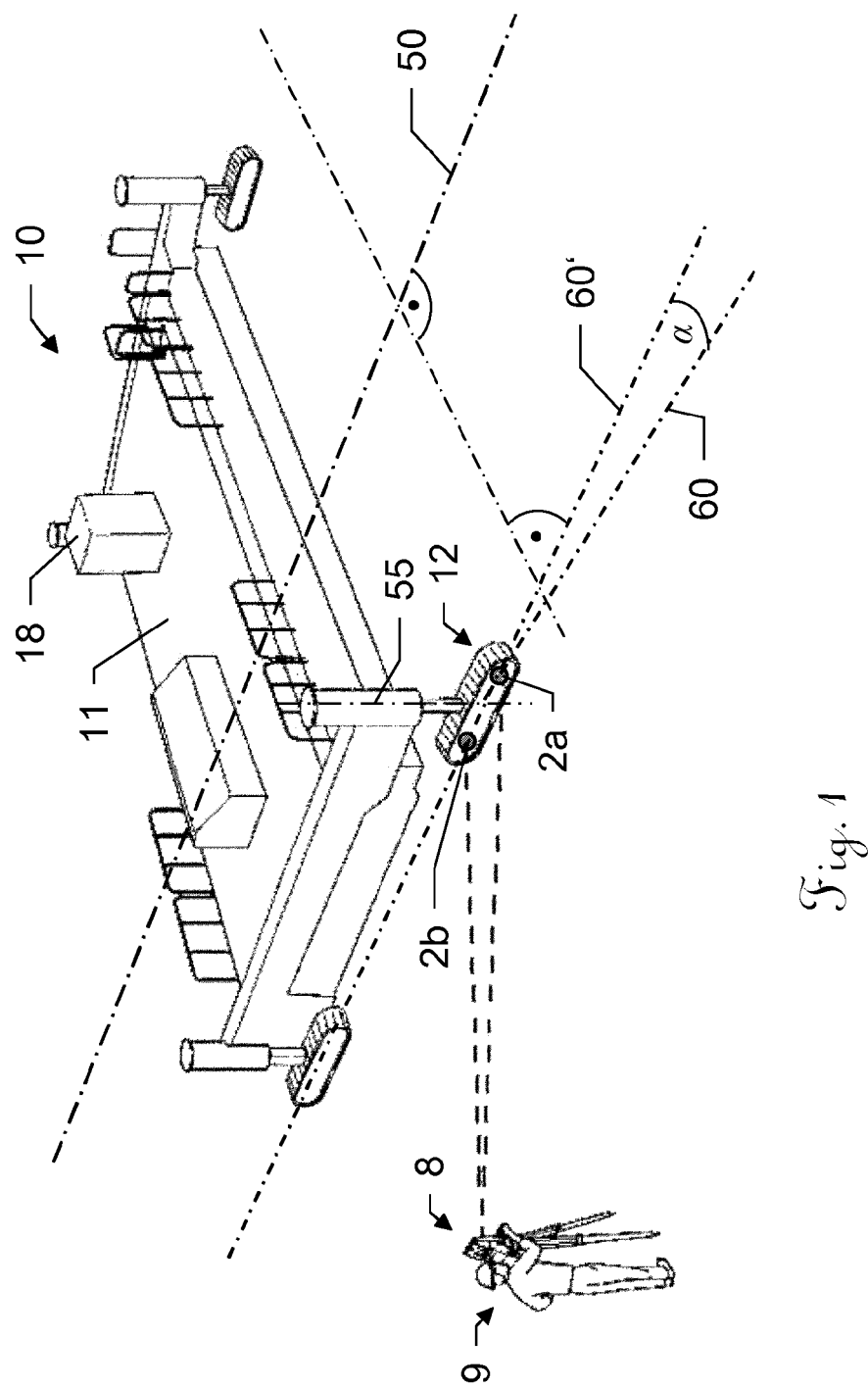
FIG. 1 shows a tracked automated roadwork machine with a first exemplary embodiment of an Automatic Track Alignment Control Kit according to the invention.

FIG. 1 shows a tracked automated roadwork machine 10 being equipped with an Automatic Track Alignment Control Kit (ATACK). A surface processing unit (not shown here) for carrying out a material processing step is mounted to the machine frame 11 of the roadwork machine 10. The depicted machine 10 comprises four track units (only three of which being visible here) with tracks for moving the roadwork machine 10 in the direction of a first axis 50 and actuator means for pivoting the track units 12,12',12" about a second axis 55 with respect to the machine frame 11, wherein the second axis 55 is basically orthogonal to the first axis 50. The machine 10 furthermore comprises a machine guidance system for controlling the tracks and the actuator means of the track units. Obviously, also machines with more or fewer tracks than four can be equipped with the ATACK.

The ATACK comprises a robotic total station 8, a control and evaluation unit 18 and two retro-reflectors 2a,2b being part of a track alignment detection unit (not shown) that is attached to a first track unit 12 of the machine 10. A user 9 determines an orientation 60 of the track unit 12 by measuring coordinates of the two retro-reflectors 2a,2b. The control and evaluation unit 18 calculates a difference between the current orientation 60 of the track unit 12 and a known orientation 50 of the surface processing unit. The control and evaluation unit 18 calculates a correction angle α about which the track unit 12 needs to be pivoted in order to be aligned with the surface processing unit. This deviation information is then transmitted to the machine guidance system which can pivot the track unit 12 until it reaches an orientation 60' which is parallel to the orientation 50 of the surface processing unit.

The orientation 50 of the surface processing unit or the machine frame to which is surface processing unit is attached can be determined by means of a frame orientation detection means comprising at least one, particularly two, retro-reflectors that are attached to the machine frame, to which direction and distance from the total station are measured. Alternative ways to determine the orientation 50 of the surface processing unit are also possible, for instance reflectorless determination of the orientation of frame part that has a known dimension and orientation with respect to the orientation 50 of the surface processing unit.

Figure 2:
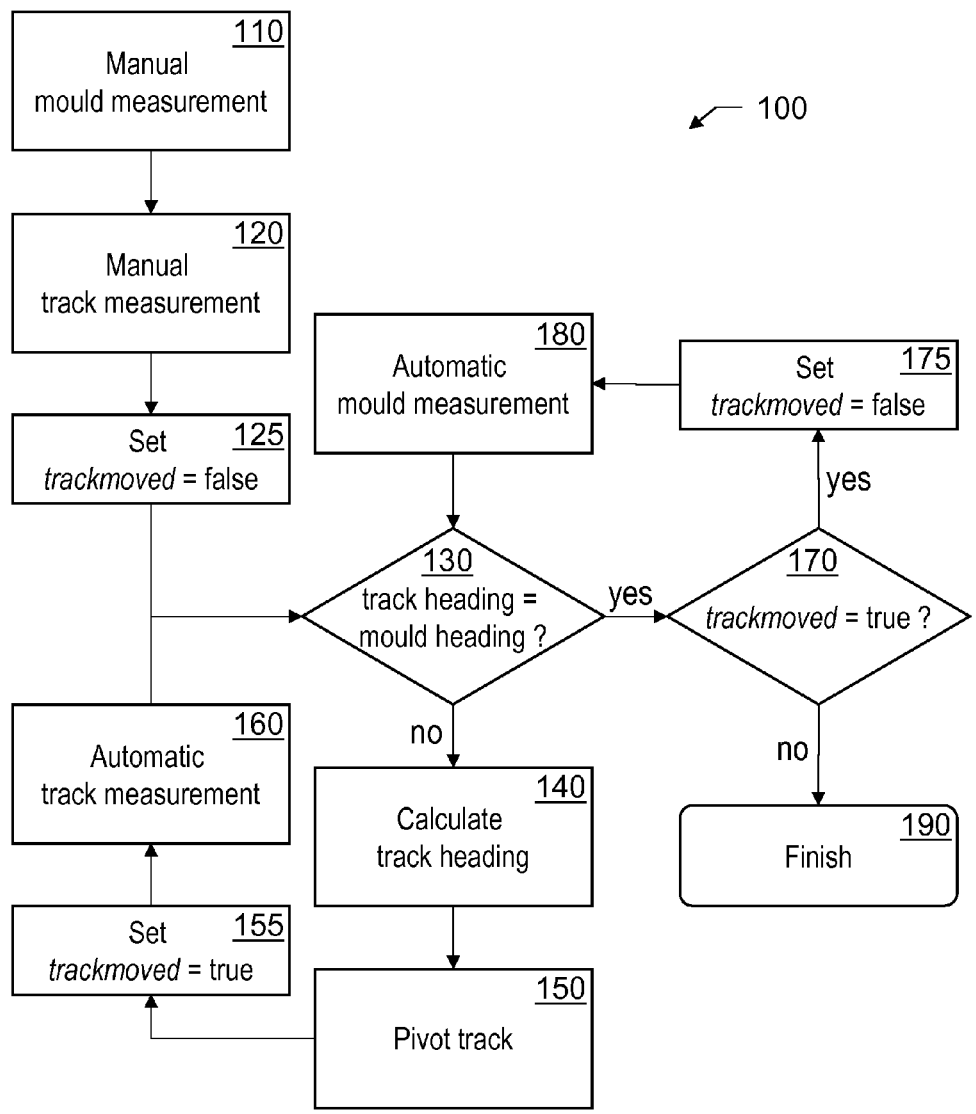
FIG. 2 shows a flow chart illustrating an exemplary embodiment of the method according to the invention.

FIG. 2 shows a flow chart illustrating an exemplary embodiment of the method 100 according to the invention.

The "TrackMoved Flag" of the steps 125, 155 and 175 is a Boolean flag which is used to describe if a track has been turned since the last mould movement. As track movements can affect the mould heading, the mould alignment must be checked after any track movement. When using the machine reference points as heading reference, a machine calibration has to be done on forehand. In particular, the user is asked what reference should be used.

In order to initiate the measurement process, a user sets up a robotic total station next to the machine. This robotic total station need not be accurately positioned via resection, which advantageously allows a very quick setup. The process is then started from the machine guidance system, and the machine put under automatic control.

The user is prompted from the machine guidance system and/or the robotic total station to measure the position of the two retro-reflectors on the mould unit or machine frame (step 110), and then the two retro-reflectors mounted on the track unit (step 120). In step 125, the "TrackMoved Flag" is then set to "false".

In the next step 130, the heading of the mould unit and the heading of the track unit are calculated and a difference between the headings is determined. If there is a difference, and particularly if this difference exceeds a threshold value, the track unit needs to be pivoted and the method continues with step 140.

In step 140, a correction movement is calculated, e.g. the correction angle that the track unit needs to be pivoted in order to bring it into alignment with the mould. Particularly, also the heading and length of the track unit is determined, so that the distance can be calculated which the rear or front end of the track would have to move as the track unit is pivoted for performing the correction movement.

In step 150, the machine guidance system initiates the pivoting of the track unit. Preferably, the pivoting is monitored by the robotic total station, in particular by tracking one of the retro-reflectors attached to the track unit. When the calculated required orientation of the track unit has been reached as monitored by the robotic total station, the machine guidance system stops the pivoting. In step 155, the "TrackMoved Flag" is set to "true".

In step 160, the robotic total station determines the orientation of the track unit, by determining the distance and direction to the two retro-reflectors on the track unit. Preferably first the closest end of the track unit, in particular a first retro-reflector, is measured and then the other end, in particular a second retro-reflector. The positions of the retro-reflectors on the track unit are found using their last known location and the robotic total station's auto-find abilities.

Then step 130 is repeated. If the difference still exceeds the threshold value, the track unit needs to be pivoted again, and steps 140 to 160 and 130 are repeated. If there is no difference, or if the difference is within the threshold value, respectively, the procedure continues with step 170.

In step 170, the current value of the "TrackMoved Flag" is determined. If the value is "false", meaning that the track unit has not been moved since its heading has last been measured, the procedure finishes with step 190. If the value is "true", the "TrackMoved Flag" value is set to "false" in step 175 and the procedure continues with step 180.

In step 180, the robotic total station determines the orientation of the surface processing unit, particularly by measuring the position of the two retro-reflectors attached to the machine frame, preferably starting at the nearest retro-reflector. The positions of the retro-reflectors are found using their last known location and the robotic total station's auto-find abilities. Afterwards, step 130 is performed again.

When the measuring procedure is finished, the tracks are aligned with the mould unit. In step 190, the user is then informed about the alignment success. In one embodiment the procedure comprises a SET confirmation of the user in order to store the alignment.

FIGS. 3*a*-*d* illustrate a number of steps of the method described with regard to FIG. 2, showing a tracked automated roadwork machine 10 being equipped with an exemplary embodiment of an ATACK. The machine 10 comprises a machine frame 11 to which a surface processing unit 13 and four track units are attached. A first track unit 12 needs to be aligned with the surface processing unit 13.

In this embodiment, the ATACK comprises a robotic total station 8, a control and evaluation unit 18, two retro-reflectors 2*a*,2*b* being part of a track alignment detection unit (not shown) that is attached to the first track unit 12 of the machine 10, and frame orientation detection means 15 comprising two retro-reflectors that are attached to the machine frame 11 for allowing detection of an orientation of the machine frame 11 and, thus, of the surface processing unit 13.

Figure 3A:
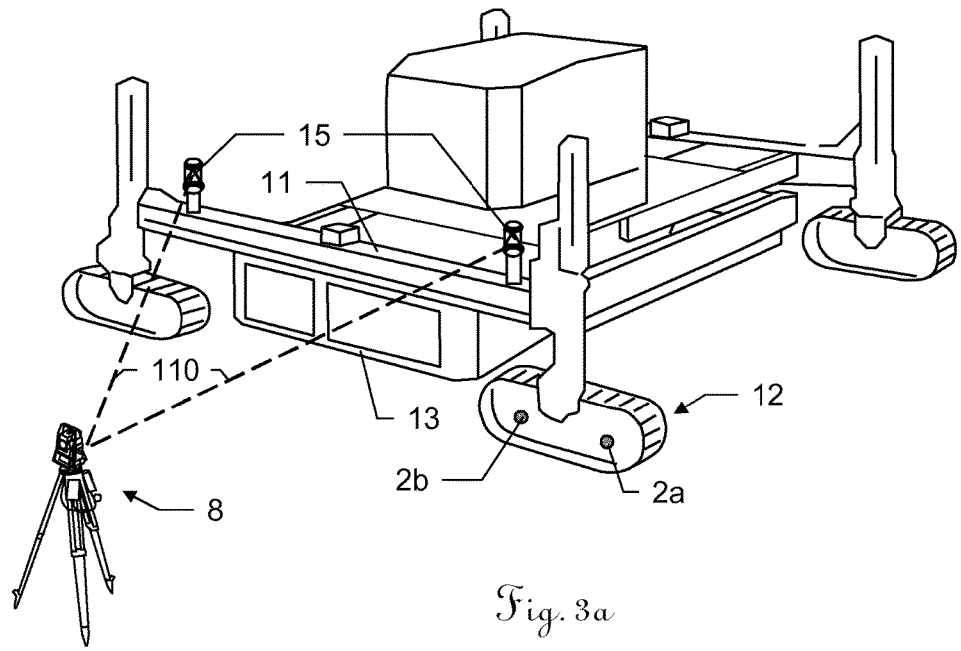
FIGS. 3a-d illustrate single steps of an exemplary embodiment of the method according to the invention, performed with an exemplary embodiment of an Automatic Track Alignment Control Kit according to the invention.

In FIG. 3*a* step 110 is illustrated: By means of the total station 8 a user (not shown) measures the positions of the two retro-reflectors of the orientation detection means 15, thus determining the orientation of the surface processing unit 13.

Figure 3B:
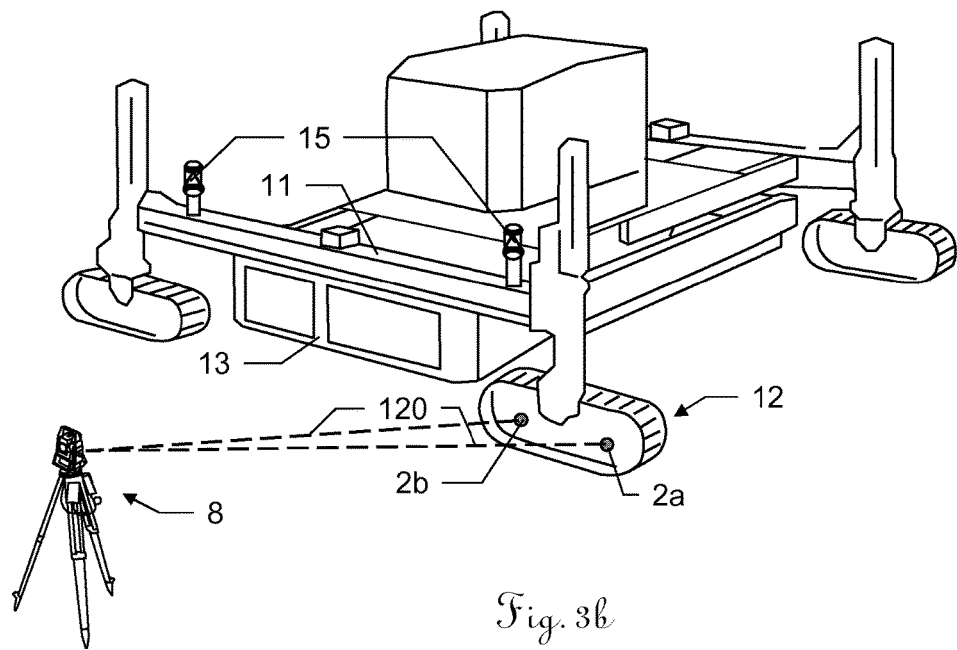

In FIG. 3*b* step 120 is illustrated: By means of the total station 8 the user measures the positions of the two retro-reflectors 2*a*,2*b*, thus determining the orientation of the track unit 12.

The two determined orientations are then compared and if they differ, particularly exceeding a pre-defined threshold value, pivoting of the track unit 12 is initiated. This is shown in FIG. 3*c*.

Figure 3C:
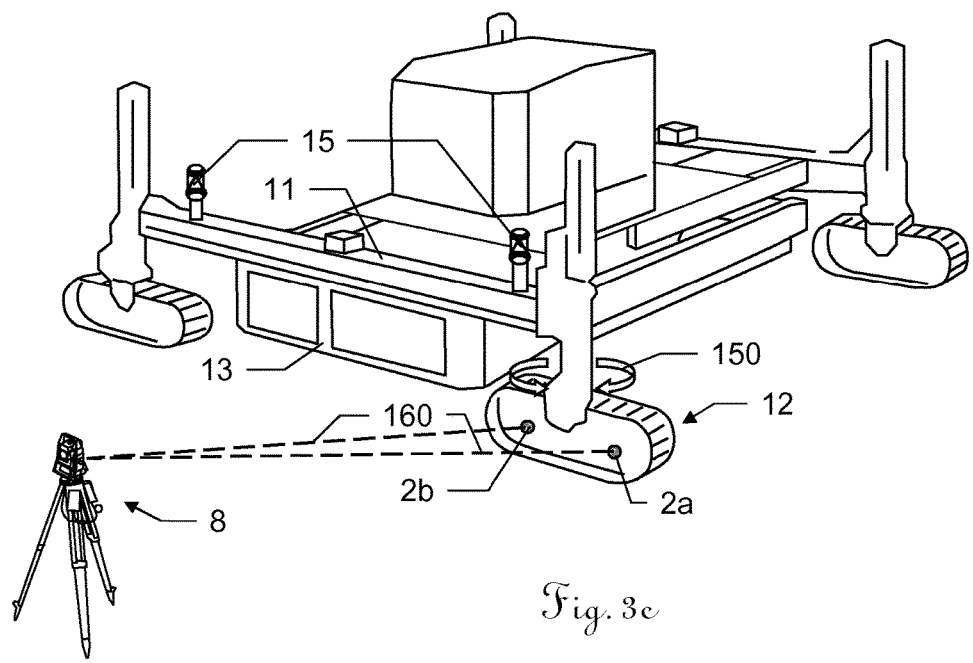

FIG. 3*c* illustrates steps 150 and 160. In step 150 the machine guidance system initiates the pivoting of the track unit 12. Preferably, the pivoting is monitored by the robotic total station 8, in particular by tracking one of the retro-reflectors 2*a*,2*b* attached to the track unit. When the desired orientation of the track unit has been reached, the machine guidance system stops the pivoting. In step 160, the robotic total station 8 determines the orientation of the track unit 12 by measuring the position of the retro-reflectors 2*a*,2*b*, preferably starting with the nearest one, in this case retro-reflector 2*b*. The positions of the retro-reflectors 2*a*,2*b* on the track unit 12 are found using their last known location and the robotic total station's auto-find abilities.

The orientation of the track unit 12 is then compared with the initially determined orientation of the surface processing unit 13 (step 110) and if they differ, particularly exceeding the pre-defined threshold value, the steps illustrated in FIG. 3*c* are repeated.

Figure 3D:
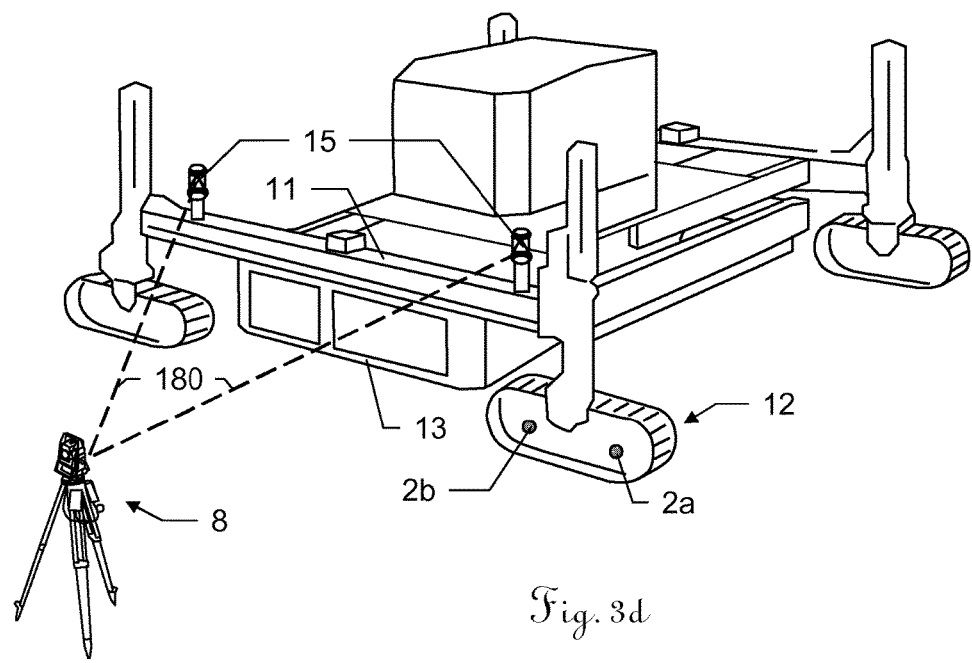

Otherwise, step 180 is performed, as illustrated in FIG. 3*d*. This step is performed because the machine frame 11 and the surface processing unit 13 unintentionally might have moved during the pivoting of the track unit 12, thus altering the orientation of the surface processing unit 13. In step 180, the robotic total station 8 measures the positions of the two retro-reflectors of the frame orientation detection means 15, preferably starting at the nearest retro-reflector, thus determining the current orientation of the surface processing unit 13. The positions of the retro-reflectors are found using their last known location and the robotic total station's auto-find abilities.

The most recently detected orientations of track unit 12 and surface processing unit 13 are then again compared. If they differ, particularly exceeding the pre-defined threshold value, the steps illustrated in FIGS. 3*c* and 3*d* are repeated until the difference is within the threshold value.

Figure 4:
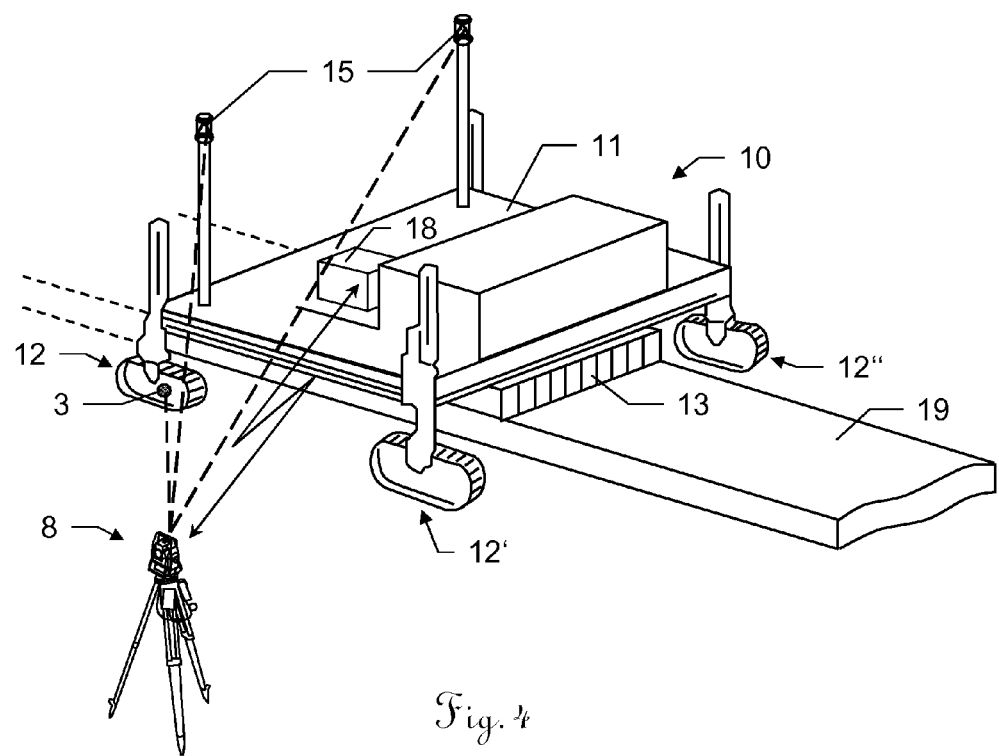
FIG. 4 shows a tracked automated roadwork machine with a second exemplary embodiment of an Automatic Track Alignment Control Kit according to the invention.

FIG. 4 shows a slipform paver as an example of a tracked automated roadwork machine 10. The paver is equipped with a second embodiment of an ATACK according to the invention. The slipform paver 10 comprises a mould unit 13 as a surface processing unit and produces a layer of concrete 19. Two masts with prisms are mounted on the crossbeams of the machine frame 11 as a frame orientation detection means 15 for allowing detection of an orientation of the mould unit 13.

The ATACK comprises a robotic total station 8, a single 6DOF retro-reflector 3 which is mounted on a first track unit 12 and a control and evaluation unit 18 which is provided on the slipform paver 10 as a part of the machine control system. The 6DOF retro-reflector 3 is adapted for allowing determining the orientation of the track unit 12. A position and orientation measurement device using such a retro-reflector is disclosed in U.S. Pat. No. 5,267,014. The robotic total station 8 is adapted for determining the distance and direction to the 6DOF retro-reflector 3 and the frame orientation detection means and hence for determining the orientation of the machine frame 11 and of the track unit 12.

The robotic total station 8 is furthermore adapted to communicate position data of the retro-reflectors and/or orientation data of the machine frame 11 and of the track unit 12 to the control and evaluation unit 18. The control and evaluation unit 18 is adapted for calculating a correction angle and for initiating pivoting of the track unit 12.

Figure 5:
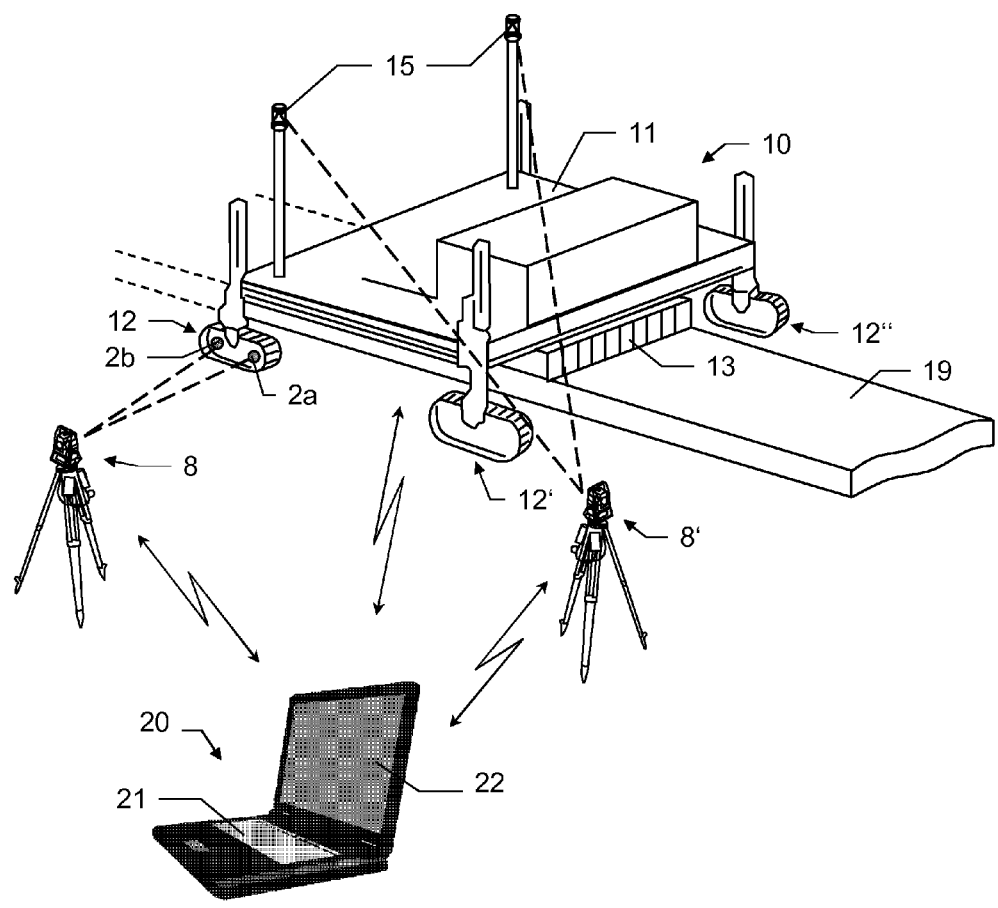
FIG. 5 shows a tracked automated roadwork machine with a third exemplary embodiment of an Automatic Track Alignment Control Kit according to the invention.

FIG. 5 shows the slipform paver 10 of FIG. 4, being equipped with a third embodiment of an ATACK according to the invention. In contrast to the embodiment shown in FIG. 4, this embodiment of the ATACK comprises two robotic total stations 8,8'. A first total station 8 for determining the orientation of the track unit 12 by determining the positions of the two retro-reflectors 2a,2b, and a second total station 8' for determining the orientation of the mould unit 13. Furthermore, in this embodiment, the control and evaluation unit 20 is part of a mobile device, e. g. a laptop computer having input means 21 and output means 22. The control and evaluation unit 20 has a wireless connection with the total stations 8,8' for receiving measurement data and sending measuring commands, and with a machine guidance unit of the paver 10 for sending pivoting commands.

Figure 6:
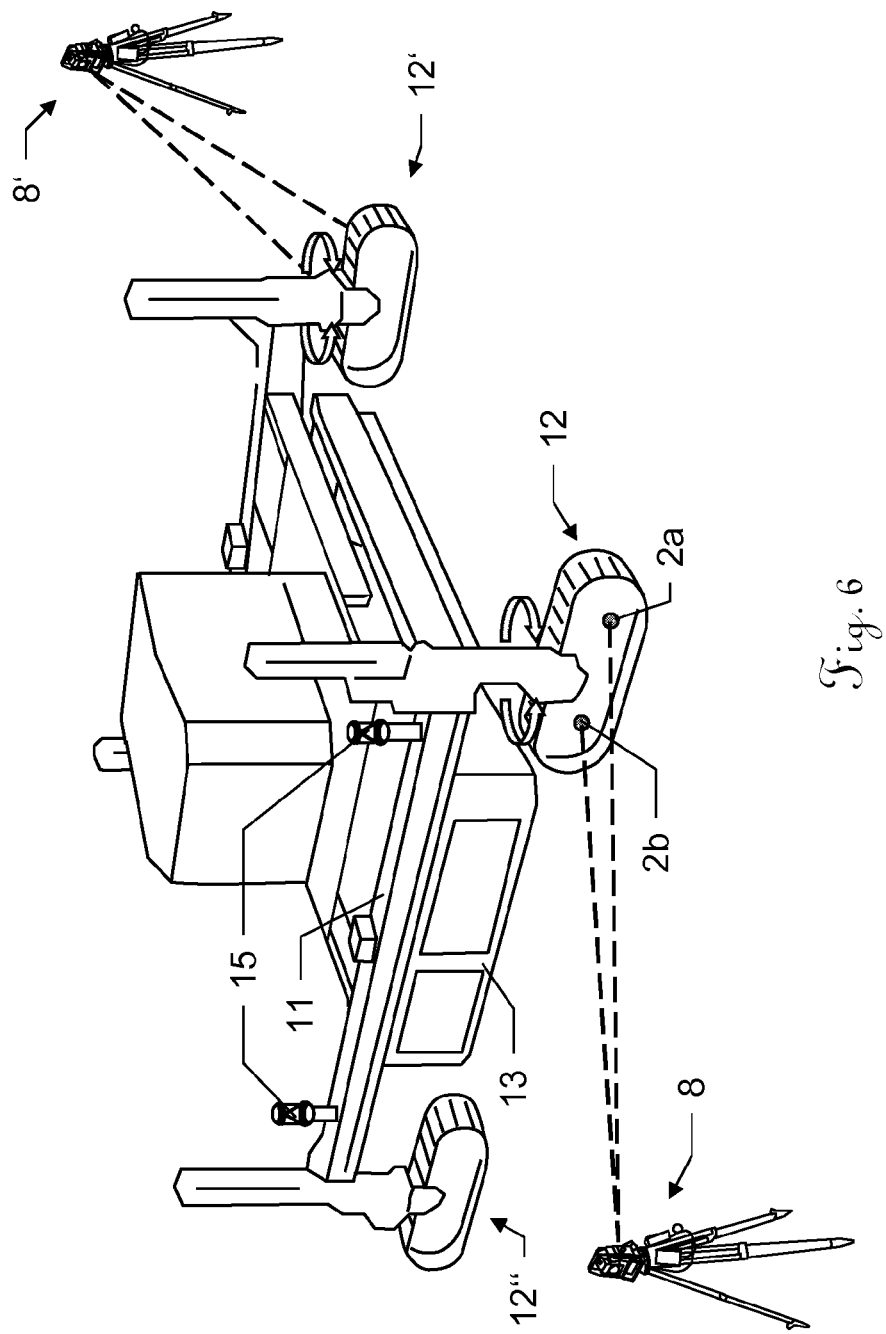
FIG. 6 shows a tracked automated roadwork machine with a fourth exemplary embodiment of an Automatic Track Alignment Control Kit according to the invention.

FIG. 6 shows a further tracked automated roadwork machine 10, being equipped with a fourth embodiment of an ATACK according to the invention.

The ATACK comprises two robotic total stations 8,8', a first pair of retro-reflectors 2a,2b attached to a first track unit 12 and a second pair of retro-reflectors (not shown) attached to a second track unit 12'. The ATACK furthermore comprises frame orientation detection means 15 attached to the machine frame 11 and a control and evaluation unit being integrated into the first total station 8. The first total station 8 is used for determining the orientation of the first track unit 12 and of the machine frame 11—and, thus, of the surface processing unit 13. The second total station 8' is used for determining the orientation of the second track unit 12'.

Figure 7A:
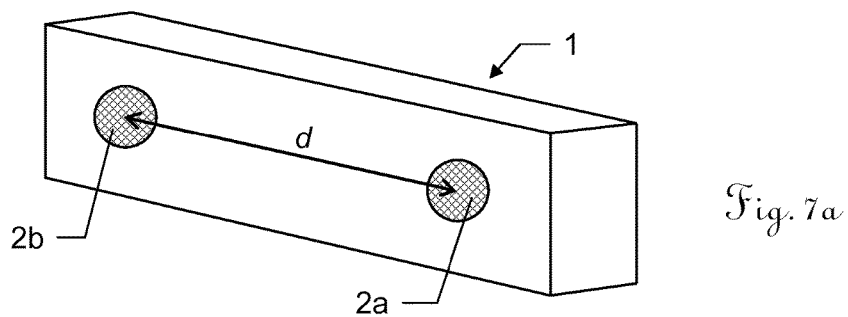
FIGS. 7a-c show a first exemplary embodiment of a track alignment detection unit according to the invention in a front view, in a rear view and attached to a track unit of a tracked automated roadwork machine.
Figure 7B:
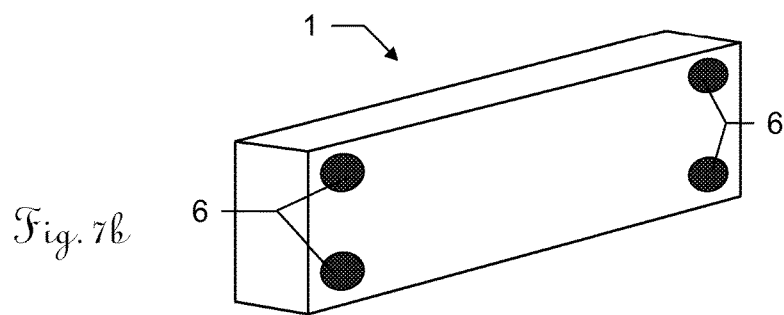
Figure 7C:
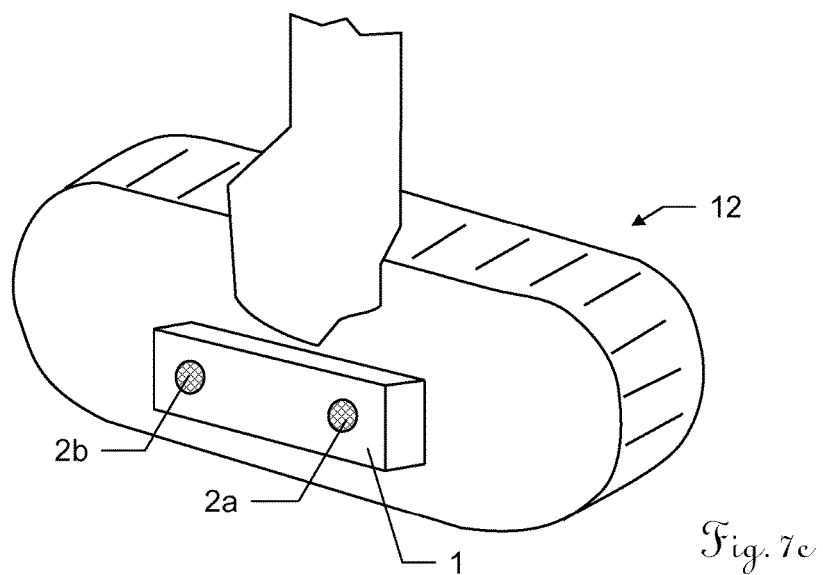

FIGS. 7a-c show a first embodiment of a track alignment detection unit 1 according to the invention. In FIG. 7a the track alignment detection unit 1 is shown in a front view. It has two retro-reflectors 2a,2b that are positioned on the track alignment detection unit 1 with a known distance d. In FIG. 7b the backside of the track alignment detection unit 1 is shown. It comprises a number of magnets 6 for attaching the track alignment detection unit 1 to a track unit 12. In FIG. 7c the track alignment detection unit 1 is depicted being attached to a track unit 12. By means of the two retro-reflectors 2a,2b and using a total station (not shown) an orientation of the track alignment detection unit 1 and, thus, of the track unit 12 is determinable.

Figure 8A:
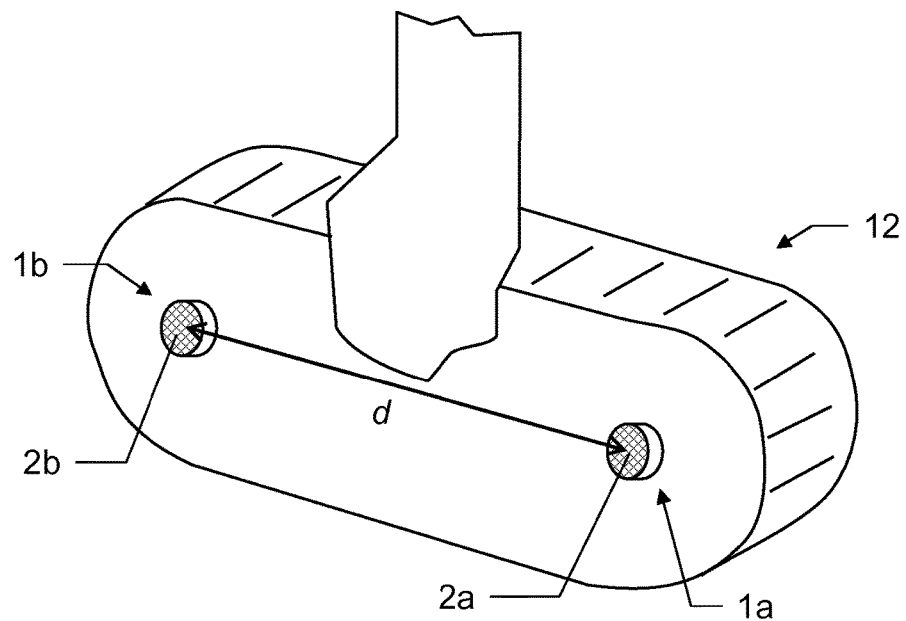
FIGS. 8a-b show a second exemplary embodiment of a track alignment detection unit according to the invention.
Figure 8B:
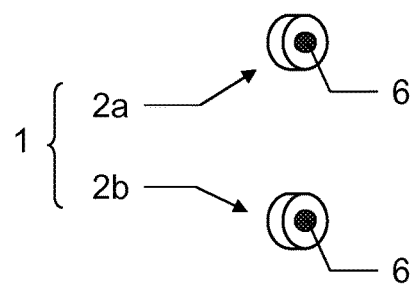

FIGS. 8a and 8b show a second embodiment of a track alignment detection unit 1 consisting of two parts 1a,1b, each part comprising a retro-reflector 2a,2b. In FIG. 8a the two parts are attached to a track unit 12. By means of the two retro-reflectors 2a,2b and using a total station (not shown) an orientation of the track alignment detection unit 1 and, thus, of the track unit 12 is determinable. FIG. 8b shows the two parts 1a,1b of the unit 1 in a rear view. Each part 1a,1b comprises a magnet for attachment to the track unit 12.

Figure 9:
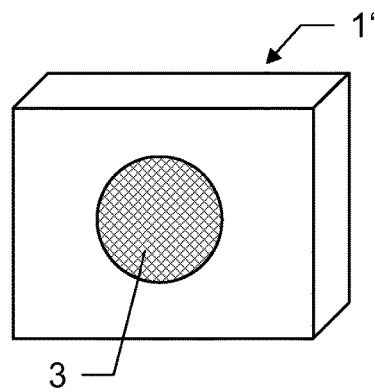
FIG. 9 shows a third exemplary embodiment of a track alignment detection unit according to the invention.
Figure 10:
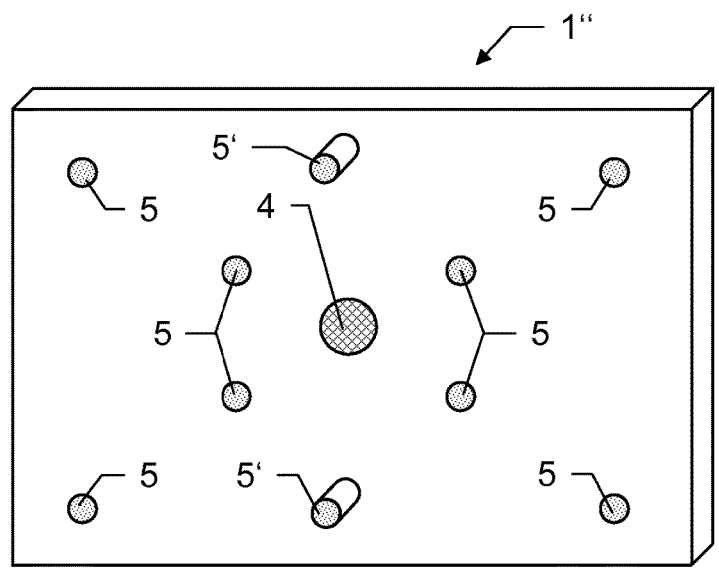
FIG. 10 shows a fourth exemplary embodiment of a track alignment detection unit according to the invention.

In FIGS. 9 and 10 two alternative embodiments of a track alignment detection unit 1',1" according to the invention are depicted.

FIG. 9 shows a second embodiment of a track alignment detection unit 1', comprising a single 6DOF retro-reflector 3, which is adapted for allowing determining the orientation of the track alignment detection unit 1'.

FIG. 10 shows a third embodiment of a track alignment detection unit 1", comprising a single retro-reflector 4 and a number of light emitting diodes 5 forming a defined pattern, from which the orientation of the track alignment detection unit 1" can be deduced by means of a camera. This embodiment e. g. can be used together with a laser tracker having a camera.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for aligning tracks of a roadwork machine, the roadwork machine being designed for producing and/or processing a surface layer comprising concrete or asphalt material along a predetermined path, and comprising a machine frame with:
   a surface processor for carrying out a material processing step,
   a plurality of track units with tracks for moving the roadwork machine along a first axis and actuators for pivoting the track units about a second axis with respect to the machine frame, wherein the second axis is orthogonal to the first axis, and
   a machine guidance system for controlling the tracks and the actuators of the track units,
   wherein at least one retro-reflector is attached to a first track unit for allowing detection of an orientation of the first track unit, and at least one retro-reflector is attached to the machine frame for allowing detection of an orientation of the machine frame;
   the method comprising:
   determining an initial orientation of the machine frame,
   determining an initial orientation of the first track unit,
   determining whether a difference between a most recently determined orientation of the machine frame and a most recently determined orientation of the first track unit is within a predefined threshold value,
   initializing a pivoting of the first track unit,
   determining a changed orientation of the first track unit after the pivoting, and
   determining an orientation of the machine frame after the pivoting.

2. The method according to claim 1, further comprising:
   repeating the following steps until an angular difference between a most recently determined orientation of the machine frame and a most recently determined orientation of the first track unit is within a predefined threshold value:
   reiteratively pivoting the first track unit and determining its orientation after the pivoting, until the angular difference is within the predefined threshold value, and
   determining an orientation of the machine frame.

3. The method according to claim 1, wherein
   for pivoting the track unit, a correction angle is calculated in a control and evaluation unit, wherein the track unit is pivoted about the correction angle.

4. The method according to claim 1, wherein the steps
   determining an initial orientation of the machine frame, and
   determining an initial orientation of the first track unit,
   are performed by a user using a geodetic surveying instrument.

5. The method according to claim 1, wherein the steps
   determining a changed orientation of the first track unit after the pivoting, and determining an orientation of the machine frame after the pivoting, are performed automatically by means of a geodetic surveying instrument.

6. The method according to claim 1, wherein
a geodetic surveying instrument is used for determining the orientations, by measuring distance and direction to the at least one retro-reflector that is attached to the first track unit.

7. The method according to claim 1, wherein
a retro-reflector and an optically perceivable pattern are attached to the first track unit for allowing detection of the orientation of the first track unit; and
determining the orientations is performed by means of a laser tracker having a camera.

8. The method according to claim 1, wherein:
two retro-reflectors that are fixedly connected to each other in a known distance are attached to the first track unit for allowing detection of the orientation of the first track unit.

9. The method according to claim 3, wherein:
two retro-reflectors are positioned on the track unit at a known distance from each other, and
calculating the correction angle is based on the most recently determined orientation of the machine frame, the most recently determined orientation of the track unit and the known distance between the two retro-reflectors, in particular wherein the correction angle is calculated by the equation:

$$\alpha = \sin\left(\frac{\text{frame orientation} - \text{track orientation}}{2}\right) \cdot \left(\frac{d}{2}\right) \cdot 2.$$

10. An Automatic Track Alignment Control Kit for aligning tracks of a roadwork machine, the roadwork machine being designed for producing and/or processing a surface layer comprising concrete or asphalt material along a predetermined path, and comprising a machine frame with
a surface processor for carrying out a material processing step,
a plurality of track units with tracks for moving the roadwork machine along a first axis and actuators for pivoting the track units about a second axis with respect to the machine frame, wherein the second axis is orthogonal to the first axis, and
a machine guidance system for controlling the tracks and the actuators of the track units,
wherein the Automatic Track Alignment Control Kit comprises:
an orientation determining device comprising a laser range finder
at least one retro-reflector for use with the laser range finder, and
a control and evaluation unit,
wherein:
the at least one retro-reflector is designed for being attachable to a first track unit of the roadwork machine,
the orientation determining device is designed for determining an orientation of the first track unit and an orientation of the machine frame, and
the control and evaluation unit is designed for determining an orientation of the first track unit relative to the machine frame and for sending a command to the machine guidance system to pivot the first track unit in order to align the first track unit and the machine frame, wherein the control and evaluation unit is designed for performing the following steps:
initializing a pivoting of the first track unit,
determining the orientation of the first track unit after pivoting,
determining an orientation of the machine frame after pivoting, and
determining whether a difference between a most recently determined orientation of the machine frame and a most recently determined orientation of the first track unit is within a predefined threshold value.

11. The Automatic Track Alignment Control Kit according to claim 10, further comprising:
at least one retro-reflector being attachable to the machine frame for use with the laser range finder for allowing detection of the orientation of the machine frame.

12. The Automatic Track Alignment Control Kit according to claim 10, wherein for allowing determining the orientation of the first track unit, the Kit comprises one of:
two retro-reflectors that are fixedly connected to each other in a known distance,
a 6DOF retro-reflector, and
a retro-reflector and an optically perceivable pattern.

13. The Automatic Track Alignment Control Kit according to claim 10, wherein
the orientation determining device is a robotic total station or tacheometer or a laser tracker, and is adapted for automatically aiming the laser range finder at the at least one retro-reflector and automatically measuring a distance and direction to the retro-reflector.

* * * * *